United States Patent [19]

Kuzukawa et al.

[11] Patent Number: 5,707,048
[45] Date of Patent: Jan. 13, 1998

[54] VIBRATION DAMPENING DEVICE WITH AN ELASTIC BODY AND VISCOUS LIQUID

[75] Inventors: Mitsuo Kuzukawa; Tatsuo Tanaka, both of Ageo, Japan

[73] Assignee: Fukoku Co., Ltd., Saitama-ken, Japan

[21] Appl. No.: 659,233

[22] Filed: Jun. 5, 1996

Related U.S. Application Data

[63] Continuation of Ser. No. 356,550, Dec. 15, 1994, abandoned.

[30] Foreign Application Priority Data

Feb. 15, 1994 [JP] Japan .................. 6-040398

[51] Int. Cl.$^6$ .................................................. F16F 13/12
[52] U.S. Cl. ........................... 267/140.13; 267/140.11
[58] Field of Search ................ 267/140.11, 140.12, 267/140.13, 219, 220, 35; 248/636

[56] References Cited

U.S. PATENT DOCUMENTS

| | | | |
|---|---|---|---|
| 4,159,091 | 6/1979 | Le Salver et al. | 267/140.13 |
| 4,610,438 | 9/1986 | Eberhard et al. | 267/140.13 |
| 4,623,135 | 11/1986 | Ray | 267/140.13 |
| 4,733,854 | 3/1988 | Miyamoto . | |
| 4,770,396 | 9/1988 | Jouade | 267/140.13 |
| 4,986,510 | 1/1991 | Bellamy et al. | 267/140.13 |

FOREIGN PATENT DOCUMENTS

| | | | |
|---|---|---|---|
| 0133122 | 7/1982 | European Pat. Off. . | |
| 0277056 | 1/1988 | European Pat. Off. . | |
| 2356847 | 6/1976 | France . | |
| 3312529 | 4/1983 | Germany . | |
| 3522333 | 1/1987 | Germany | 267/140.13 |
| 61-286631 | 12/1986 | Japan | 267/140.13 |
| 62-56642 | 3/1987 | Japan | 267/140.13 |
| 06257638 | 9/1994 | Japan . | |
| 9309302 | 11/1992 | WIPO . | |

*Primary Examiner*—Matthew C. Graham
*Attorney, Agent, or Firm*—Townsend & Banta

[57] ABSTRACT

A fluid-filled mount using an elastic body and a viscous fluid to obtain a great damping force has for its object to facilitate the filling of the viscous fluid and to considerably improve the sealability, and comprises a case having a mounting plate with mounting holes and fixing claws together with a cup, a cylindrical case having a mounting plate with mounting holes together with a cylinder, a stud having an axial through hole for viscous fluid filling and also having a tapped hole provided in one end of its axial through hole and a damping plate fixed to its other end, and an elastic body having the said cylindrical case embedded in it and the said stud secured in its center hole.

2 Claims, 14 Drawing Sheets

LOAD AND DISPLACEMENT OF THE DAMPING PLATE DURING IMPACT COMPRESSION

US 5,707,048

VIBRATION DAMPENING DEVICE WITH AN ELASTIC BODY AND VISCOUS LIQUID

This application is a continuation of application Ser. No. 08/356,550, filed Dec. 15, 1994 now abandoned.

BACKGROUND OF THE INVENTION

This invention relates to an anti-vibration fluid-filled mount which, in an industrial vehicle or construction equipment, such a as dump truck or power shovel, serves to hold the cab as a vibration protector on the body frame subjected directly to vibrations.

At present, cabs of industrial vehicles, such as dump trucks, and those of construction equipment, such as power shovels, need comfortable roominess and high operability, and even a gentle-to-operator, roundish design. Further, as the traveling speed of such vehicles and equipment is made increasingly high, a higher-performance cab mount surpassing a rubber-made mount is also needed to improve the cab vibrations.

In the accompanying drawings, FIG. 17 is a sectional view showing a conventional fluid-filled mount 100. In this figure, 101 is a case which comprises a mounting plate 101, a cylinder 103 having a flange 103A at its bottom, and a cup 105 containing a viscous fluid 104, such as silicone oil. The said mounting plate 102 has a coupling hole 102A at its center, as well as mounting holes 102B. In the said coupling hole 102A, the top end of the cylinder 103 is inserted and solidly secured to the said mounting plate by means of welds 106.

The said cup 105 has its brim 105A solidly fixed to the flange 103A of the said cylinder 103, for example by caulking. 107 is a stud bolt, to the bottom end of which a damping plate 108 is secured by means of a nut 109.

On the rim of the said damping plate 108, elastic stops 108A are provided.

110 is a plug which is fitted in a filling hole 105B provided to fill the said cup 105 with the said viscous fluid 104. 111 is a cylindrical elastic body having a central hole 111A, where the said stud bolt 107 is inserted and secured by heat glueing.

The girth of the said cylindrical elastic body 111 is secured to the bore of the said cylinder 103 by heat glueing. The bottom surface of the overhang 111B of the said cylindrical elastic body 111 is secured onto the top surface of the said mounting plate 102 by heat glueing.

On the top end of the stud bolt 107 of such fluid-filled mount 100, such cab 5 of a dump truck 1 as shown in FIG. 18 and FIG. 19 is fitted. FIG. 18 shows the setup of a common dump truck 1 as an example of industrial vehicles, while FIG. 19 is a detail of P in FIG. 18. Brackets 3, 8 are fastened to the frame 2 of the dump truck 1, and the cab 5 has its floor 6 fitted to each of the brackets 3, 8 through the aforesaid fluid-filled mount 1 so as to prevent the transmission of vibrations from road surface and others directly to the cab 5.

In such case, to each of the said brackets 3, 8, the mounting plate 102 of the fluid-filled mount 100 is fastened by means of bolts 128 and nuts 129, using the aforesaid mounting holes 102B, while the the stud bolt 107 of the fluid-filled mount 100 is fastened to the floor 6 by means of a nut 131 to mount the cab 5 in a vibration-proof manner. In FIG. 18, 7 is a tire of the dump truck.

In the following, the buffer operation of the fluid-filled mount 100 of the above-mentioned setup is described. When the aforesaid dump truck 1 is driven, vibrations are exerted on the truck body from the tires 7. Such vibrations are then transmitted to the aforesaid case 101. As the case 101 moves under the vibrations transmitted, the viscous fluid 104 is stirred, and the viscous resistance of the viscous fluid 104, coupled with the damping plate 108, affords a buffer action to dampen the vibrations. Thus, the vibrations transmitted to the cab 5 can be reduced. The load of the cab 5 can be supported by the cylindrical elastic body 111.

However, the conventional fluid-filled mount 100 has an inconvenience. If it is subject to impact from the outside or dropped onto a floor because of mishandling, the plug 110, which is located on the bottom of the case 101, may come out to allow the viscous fluid 104 to leak, or the caulking securing the brim 105A of the cup 105 to the flange 103A of the cylinder 103 may come loose to reduce the sealability.

Another inconvenience of the conventional fluid-filled mount is that, when great shocks are exerted on it from the outside, the pressure of the viscous fluid contained in it increases so abruptly that it can not absorb the first great shock to transmit such shock to the cab 5.

SUMMARY OF THE INVENTION

This invention is made to eliminate inconveniences of the prior art. The object of this invention is to provide a fluid-filled mount which is simplified in construction for easier filling of viscous fluid while permitting to greatly improve the sealability.

In order to achieve such an object, the fluid-filled mount according to this invention uses an elastic body and a viscous body to obtain a great damping force, and comprises a case which is provided with a mounting plate having mounting holes and fixing claws and with a cup containing a viscous fluid, a cylindrical case which is provided with a mounting plate having mounting holes and with a cylinder, a stud which has an axial through hole for filling of the said viscous fluid and which is provided with a tapped hole at one end and a damping plate secured to the other end, and an elastic body which envelopes the said cylindrical case and fixes the said stud in its center, the said elastic body, integrated with the said stud fitted with the said damping plate and also integrated with the said cylindrical case, being locked up in the cup of the said case, and the fixing claws of the said case being bent onto the mounting plate of the said cylindrical case to secure the said elastic body to the said case so as to integrate all components into one unit.

According to such a setup, the viscous fluid filling can be made easier and the sealability can greatly be improved.

Another object of this invention is to improve the shock absorbing characteristics of a fluid-filled mount.

In order to achieve such an object, the fluid-filled mount according to this invention comprises a case which contains a viscous fluid and which is subjected directly to vibrations from the outside, a stud which is fixed at one end to a cab or other vibration protector and which has a damping plate fixed to the other end, and an elastic body in the center of which the said stud is secured and which has its rim secured in close contact with the said case, the said damping plate being positioned in the said viscous fluid, the said damping plate being provided at a given location with at least one through hole, and a valve for high impact being provided on the said damping plate.

According to such setup, when a great impact is exerted on the fluid-filled mount from the outside, the abrupt rise of pressure of the viscous fluid during the first one of the corresponding vibrations can be prevented.

DETAILED DESCRIPTION OF THE PREFERRED EMBODIMENTS

Figure 1:
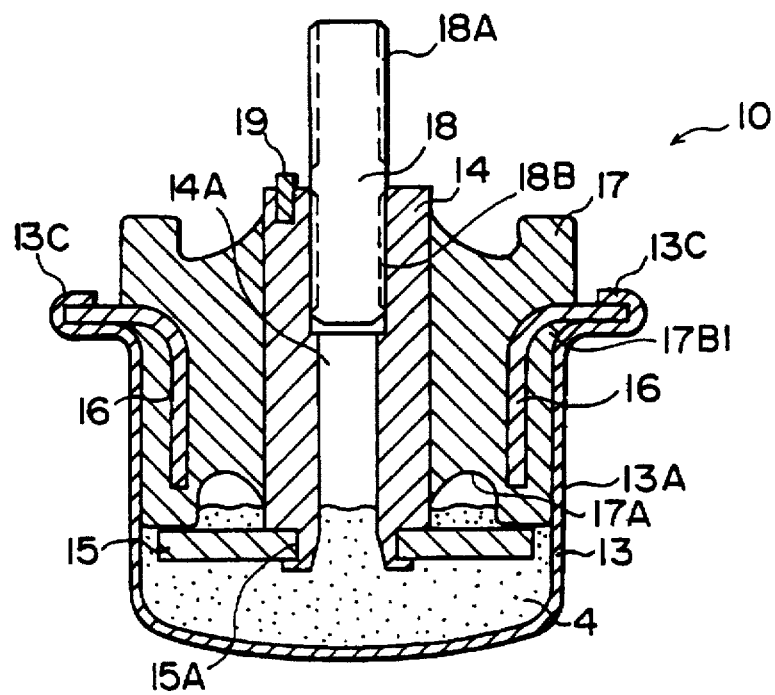
FIG. 1 is a view in section showing an embodiment of the fluid-filled mount according to this invention.
Figure 2:
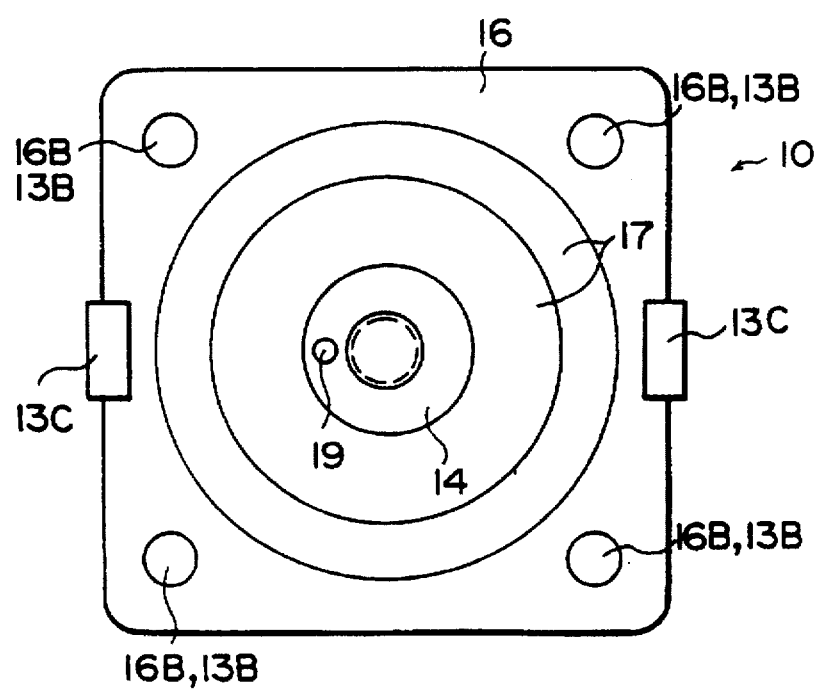
FIG. 2 is a plan view showing the fluid-filled mount of FIG. 1.
Figure 3:
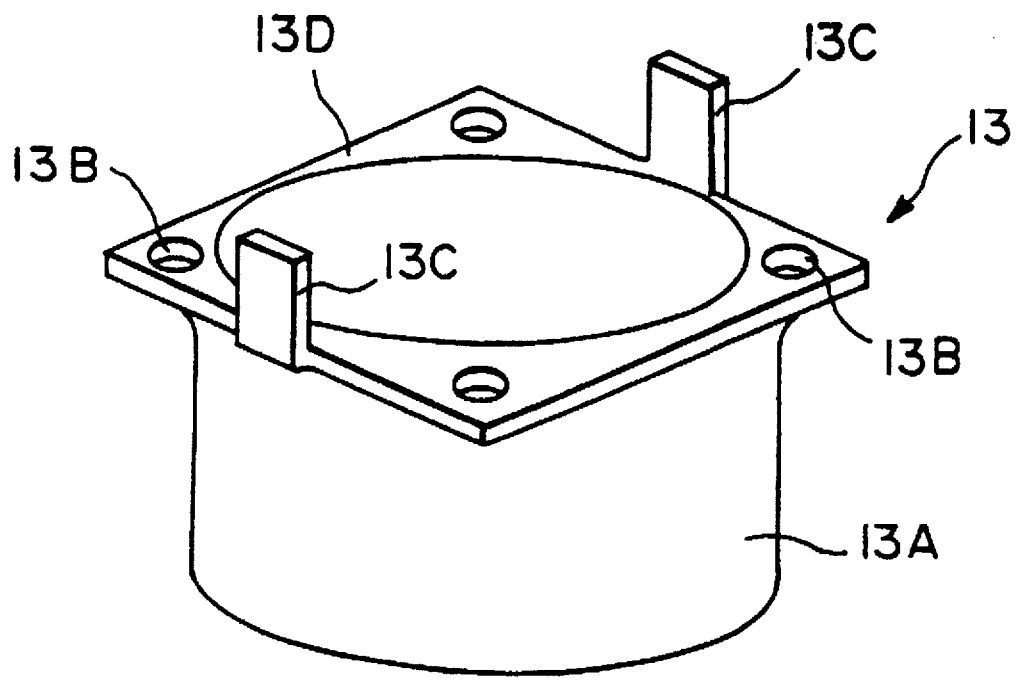
FIG. 3 is a perspective view showing in detail the case of the fluid-filled mount of FIG. 1.
Figure 4A:
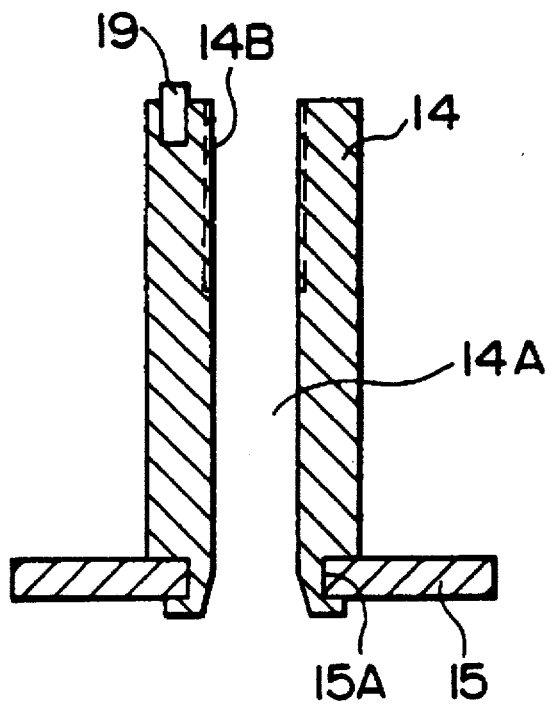
FIG. 4 (A) is a sectional view showing in detail the stud and the damping plate of the fluid-filled mount of FIG. 1.
FIG. 4(B) is a plan view showing in detail the stud and the damping plate of the fluid-filled mount of FIG. 1.
Figure 4B:
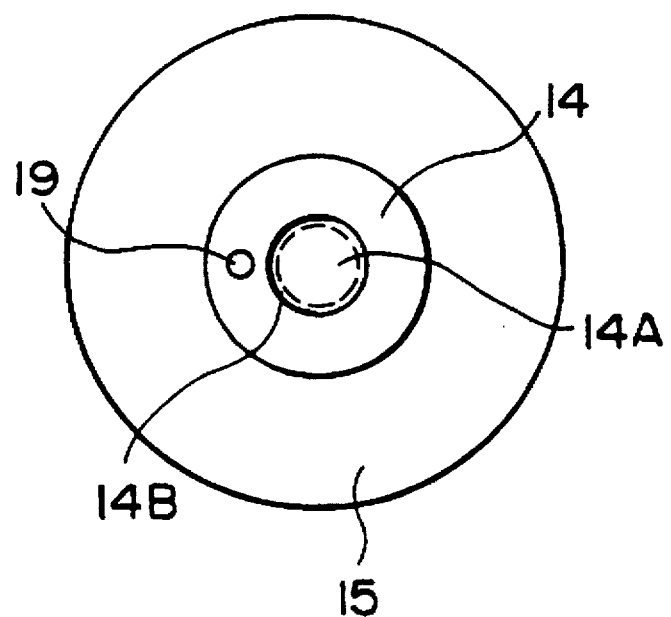

In the following, the embodiments of this invention are described in detail with reference to the accompanying drawings. FIG. 1 is a sectional view showing an embodiment of the fluid-filled mount 10 of this invention. In this figure, 13 is a case. As can be seen in its perspective view given in FIG. 3, this case 13 comprises a cup 13A and a mounting plate 13D which has mounting holes 13B and fixing claws 13C. 14 is a stud. As can be seen in its detailed view in section and plan view given in FIG. 4(A) and FIG. 4(B), respectively, this stud 14 is provided axially with a through hole 14A for filling of viscous fluid 4 and a tapped hole 14B.

15 is a damping plate. As shown in FIG. 1 and FIG. 4, this damping plate 15 is provided at its center with an opening 15A. In this opening 15A, one end of the said stud 14 is inserted and solidly fixed by caulking or other means.

Figure 5A:
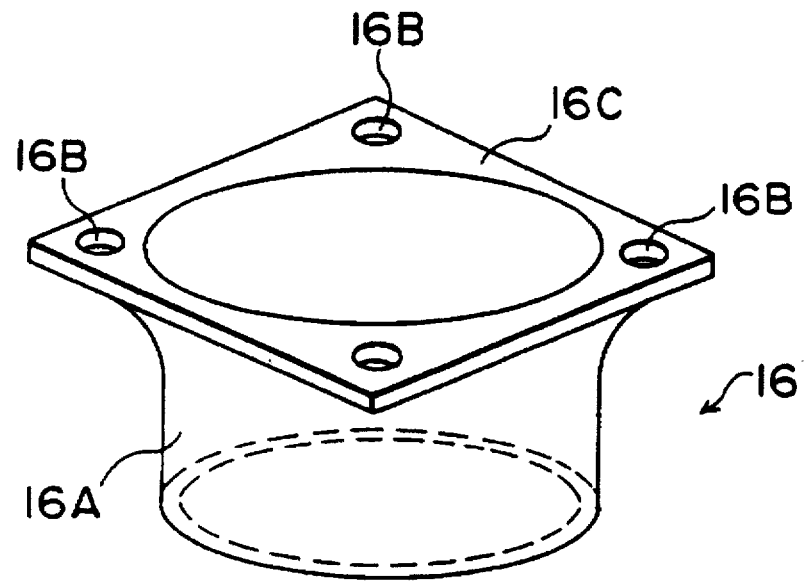
FIG. 5(A) is a perspective view showing in detail the cylindrical case of the fluid-filled mount of FIG. 1 as seen from the top.
Figure 5B:
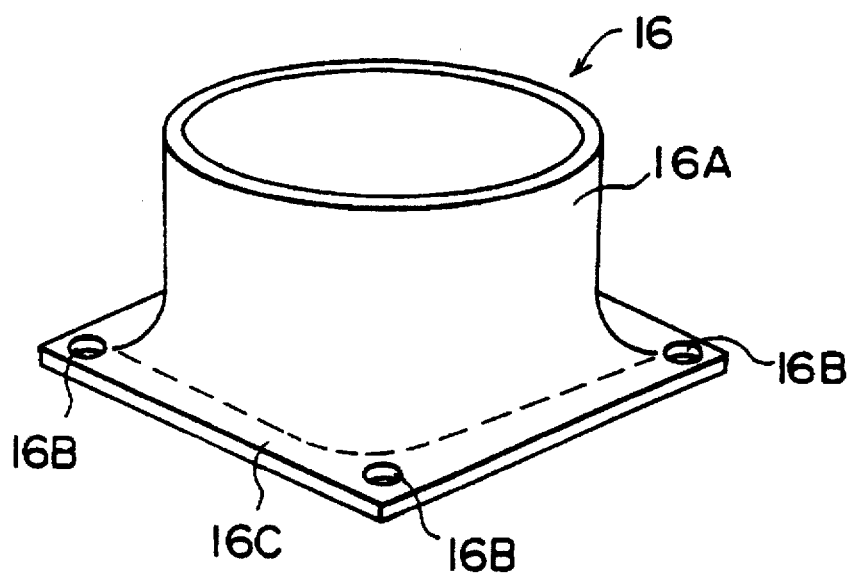
FIG. 5(B) is a perspective view showing in detail the cylindrical case of the fluid-filled mount of FIG. 1 as seen from the bottom.
Figure 6:
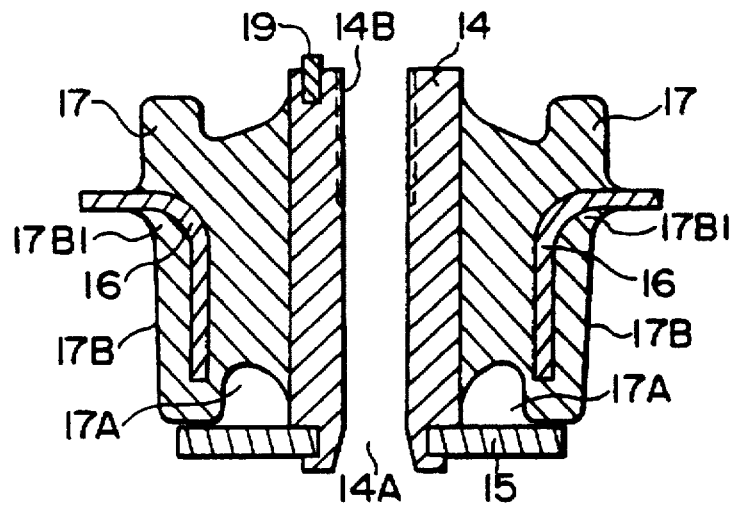
FIG. 6 is a sectional view showing the elastic body of the fluid-filled mount of FIG. 1 as integrated with the stud fitted with the damping plate and also integrated with the cylindrical case.

16 is a cylindrical case. As can be seen in its detailed perspective views given in FIG. 5(A) and FIG. 5(B), this cylindrical case comprises a cylinder 16A and a mounting plate 16C which has mounting holes 16B. 17 is an elastic body, such as rubber. As shown in FIG. 1 and FIG. 6, the said cylindrical case 16 is enveloped in this elastic body 17. The bottom surface of the elastic body 17 has a cavity 17A serving to complicate the flow of the viscous fluid 4.

Figure 18:
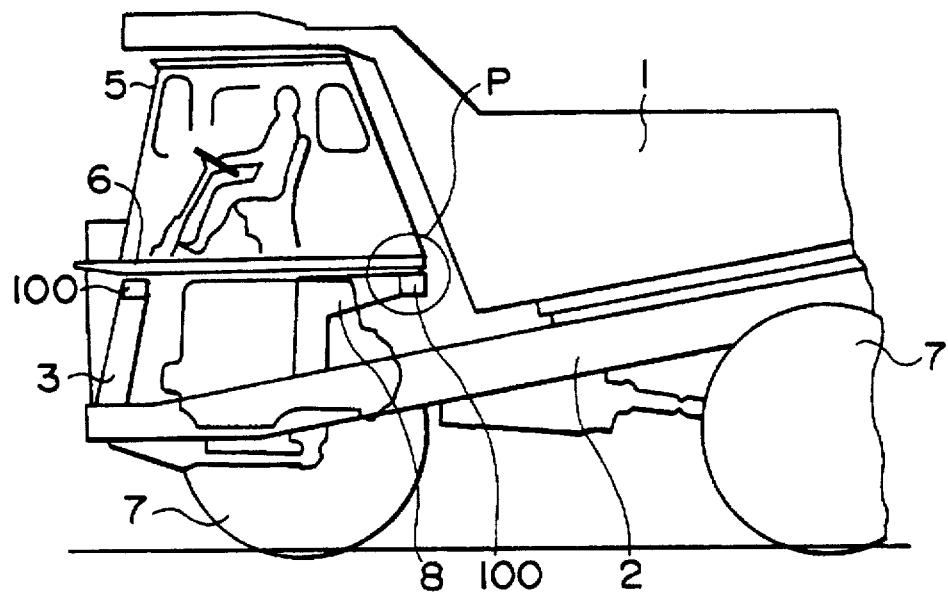
FIG. 18 shows the setup of a dump truck.

18 is a stud bolt. On one end of this stud bolt 18, a thread 18A is cut. This thread 18A is used to secure a vibration protector which is a cab 5 shown in FIG. 18 and FIG. 19. On the other end of the stud bolt 18, another thread 18B is cut. This thread 18B is screwed in the tapped hole 14B of the stud 14.

19 is an anti-rotation pin. This anti-rotation pin is fitted on the top of the stud 14.

The aforesaid elastic body 17 has its girth 17B tapered as shown in FIG. 6. Such taper allows the elastic body to come in tight contact with the inside wall surface of the cup 13A of the aforesaid case 13. The top rim of of the elastic body 17 acts as a stop for the cab 5, while its bottom rim, acts as a stop for the damping plate.

In the following, the procedure for assembling the fluid-filled mount of the above-mentioned setup is described. First, the elastic body 17 is formed while enveloping the cylindrical case 16 therein and then, the stud 14 is inserted into the center hole of the elastic body 17 and secured there by heat glueing or other means. The stud 14, the damping plate 15, the cylindrical case 16 and the elastic body 17 are thus integrated into an subassembly. This subassembly is inserted into the cup 13A of the case 13 in a such manner that the tapered girth comes in tight contact with the inside wall surface of the cup 13A.

By bending and caulking the fixing claws 13C of the case 13 so as to securely clamp the edges of the mounting plate 16C of the cylindrical case 16, the case 13 and the cylindrical case 16 can be solidly fixed together. Since the top end 17B1 of the tapered girth 17B of the elastic body 17 is then pinched and compressed in between the bend in the form of a curved surface of the cylindrical case 16 and the bend in the form of a curved surface of the cup 13B of the case 13, the tight contact of the elastic body 17 is ensured and the fluid leakage can completely be prevented.

Then, the viscous fluid 4 is injected through the center hole 14A provided in the center of the stud 14. Thereafter, the bolt 18 is screwed in the tapped hole 14B of the stud 14 to seal the viscous fluid 4. On the other end of the stud 14, the cab 5 is fitted in such a manner as shown in FIG. 19.

Figure 19:
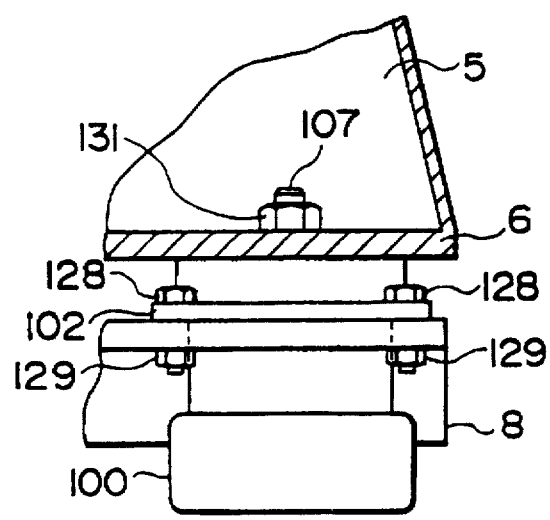
FIG. 19 is a detail of P in FIG. 18.

Since the mounting holes 13B in the mounting plate 13D of the case 13 are in register with the mounting holes 16B in the mounting plate 16C of the cylindrical case 16, the fluid-filled mount 100 can be fitted to the bracket 8 of the dump truck 1 by means of the aforesaid bolts 128 and nuts 129 in a such manner as shown in FIG. 19. Thus, the case 13 and the cylindrical case 16 can firmly be held together, including the fixing claws 13C. In addition, because the mounting plate 13D of the case 13 and the mounting plate 16C of the cylindrical case 16 become integral with each other, the strength is increased. This makes it unnecessary to use a thick mounting plate as is the case with the conventional fluid-filled mount.

As described above, according to the fluid-filled mount 10 of this invention, the viscous fluid 4 can be injected through the center hole of the stud 14. This means that the setup of the cup 13A of the case 13 can be simplified and that its manufacturing cost can be reduced. Further, because of excellent sealability, the leakage of the viscous fluid 4 can dependably be prevented.

Figure 7:
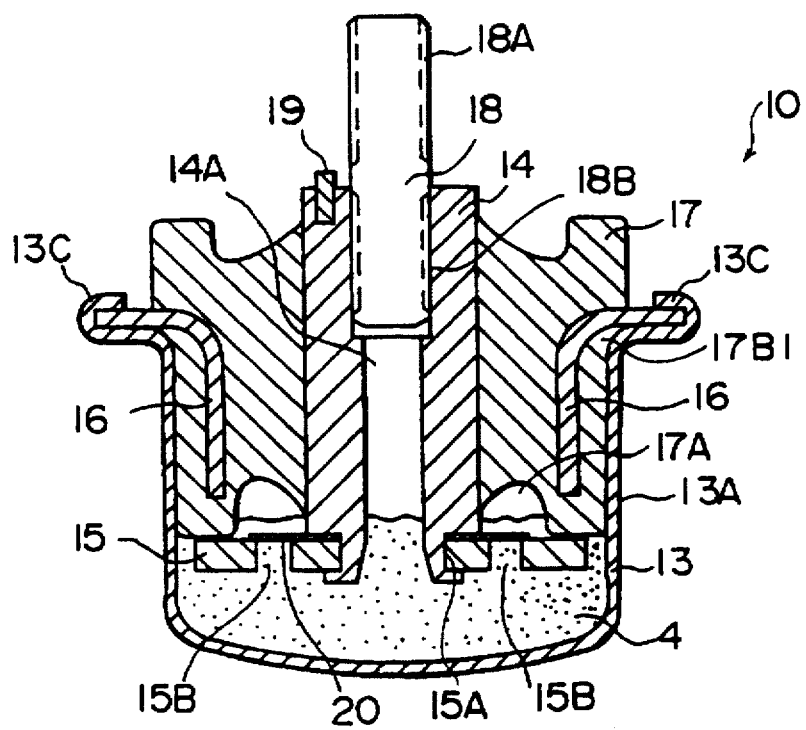
FIG. 7 is a view in section showing another embodiment of the fluid-filled mount according to this invention.
Figure 8A:
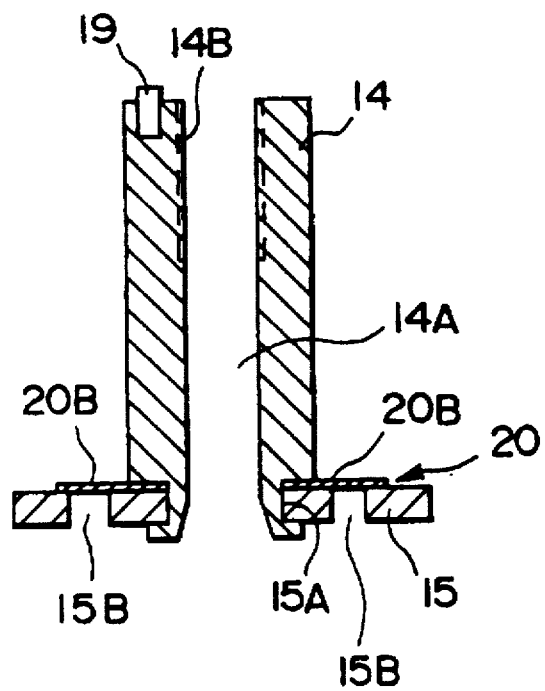
FIG. 8 (A) is a view in section showing in detail the stud, the damping plate and the valve for high impact of the fluid-filled mount of FIG. 7.
FIG. 8(B) is a plan view showing in detail the stud, the damping plate and the valve for high impact of the fluid-filled mount of FIG. 7.
Figure 8B:
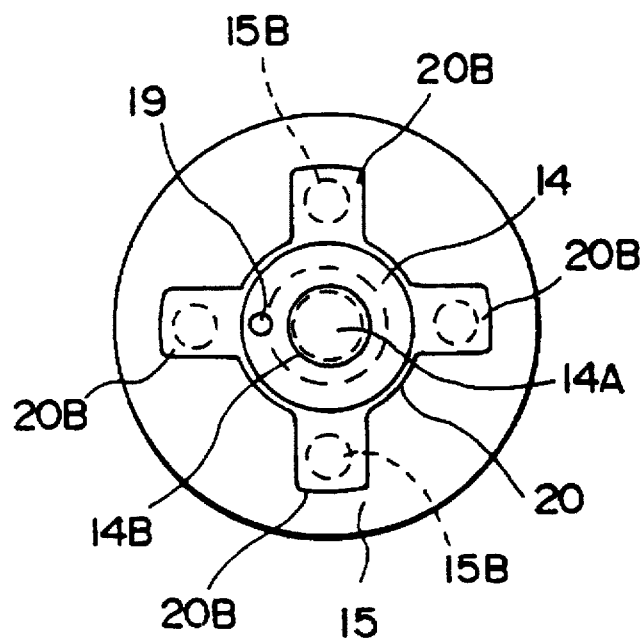
Figure 9:
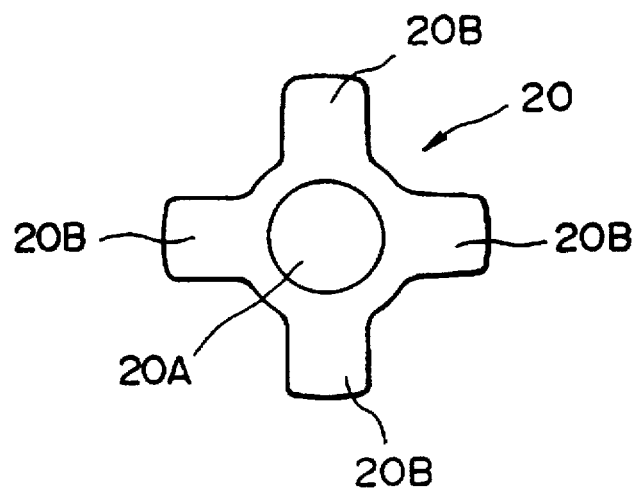
FIG. 9 is a plan view showing in detail the valve for high impact of the fluid-filled mount of FIG. 7.

In the following, the fluid-filled mount 10 of another embodiment of this invention as shown in FIG. 7 to FIG. 14 is described. In this embodiment, as shown in FIG. 7 and FIG. 8(A) and (B), the damping plate 15 has, in addition to the central opening 15A, four openings 15B therearound, for example. Additionally, in the central opening 15A, one end of the stud 14 is inserted and, at the same time, a valve for high impact 20 as hereinafter described is solidly secured on the damping plate 15 by co-fastening or other means.

Figure 10:
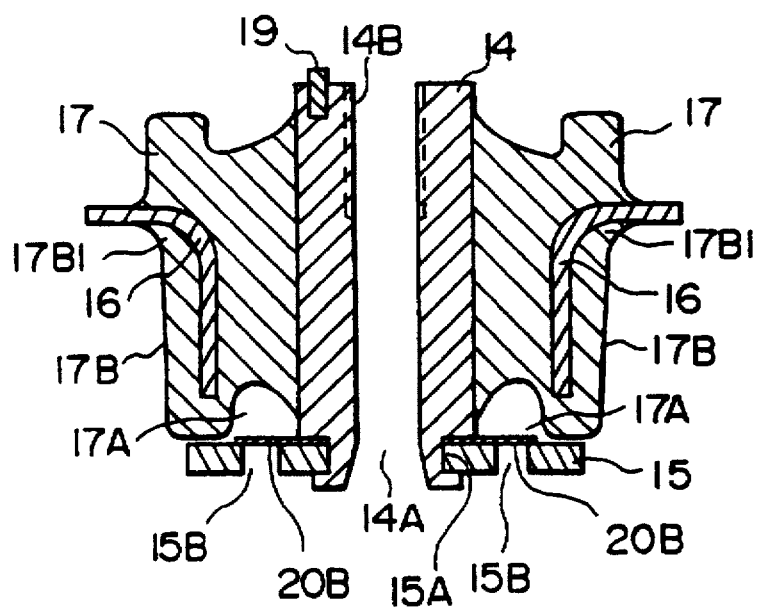
FIG. 10 is a sectional view showing the elastic body of the fluid-filled mount of FIG. 7 as integrated with the he stud fitted with the damping plate and the valve for high impact, and also integrated with the cylindrical case.

In the following, the procedure for assembling the fluid-filled mount 10 of this embodiment (FIG. 7) is described. First, the elastic body 17 in which the stud 14 and the cylindrical case 15 are enveloped is formed in the same manner already described for the aforesaid embodiment. Then, the valve for high impact 20 and the damping plate 15 are secured by the above-mentioned co-fastening or other means to integrate the stud 14, the damping plate 15, the cylindrical case 16, the elastic body 17 and the valve for high impact into a subassembly as shown in FIG. 10. This subassembly is inserted into the cup 13A of the case 13 in such a manner that the tapered girth of the elastic body 17 comes into tight contact with the inside wall surface of the cup 13A. The description of the next and succeeding steps is omitted because they are similar to those already described for the aforesaid embodiment (FIG. 1).

Figure 11:
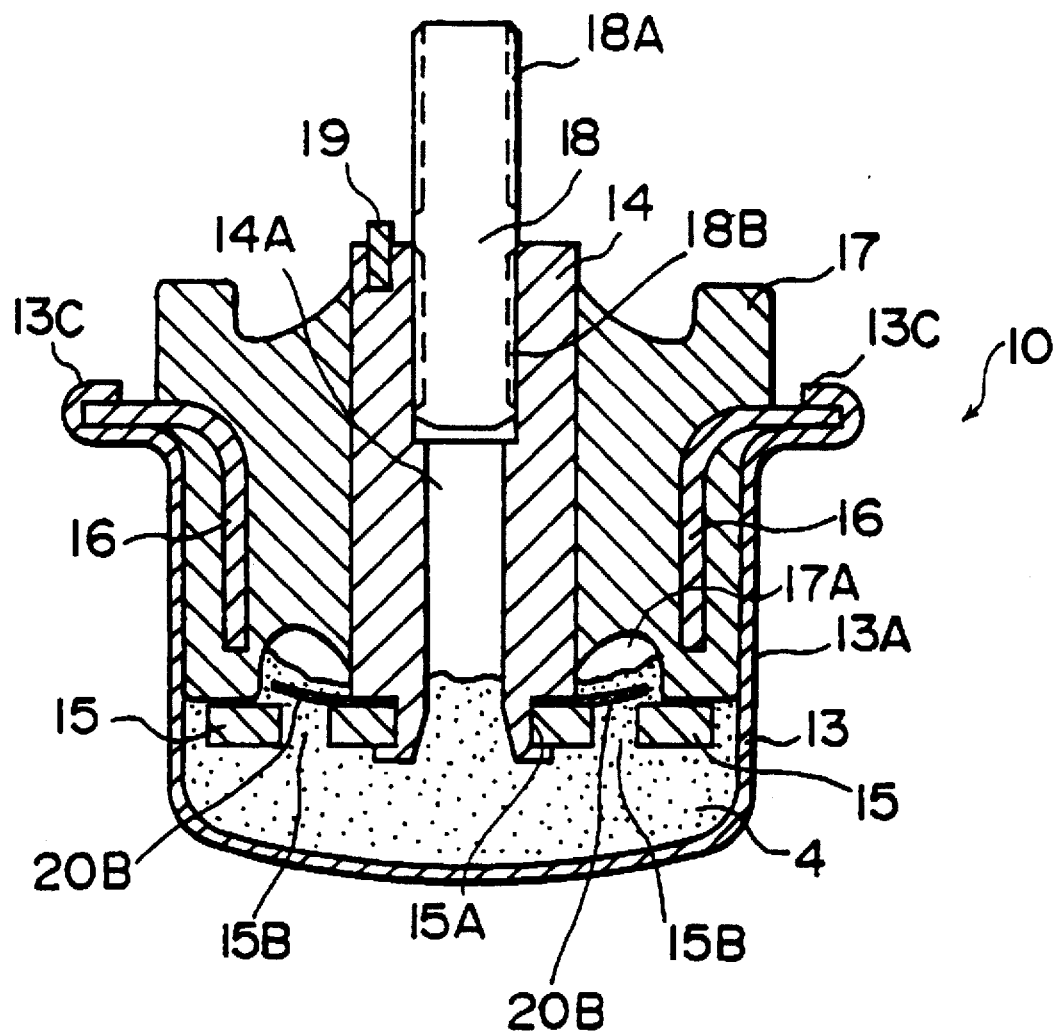
FIG. 11 is a sectional view for description of the operation of the fluid-filled mount of FIG. 7.

In the following, the damping operation of the fluid-filled mount of FIG. 7 is described. During driving of the aforesaid dump truck 1, when high impact is applied from the tires 7 directly to the truck body, such impact is transmitted to the case 13 to stir the viscous fluid 4. As a result, the viscous resistance of the viscous fluid 4 and the damping plate 15 afford a shock absorbing action to dampen the impact vibrations. Thus, vibrations transmitted to the cab 5 can be reduced. In the initial period of such impact, the pressure of the viscous fluid 4 rises abruptly, but this viscous fluid 4 under increased pressure lifts the arm 20B of the valve 20 for high impact made of spring material, through the four openings 15B in the damping plate 15, as shown in FIG. 11. As a result, the viscous fluid flows through the four openings 15B in the damping plate 15 into the cavity on the opposite side to allow considerable absorption of the first shot of impact vibration.

Figure 14:
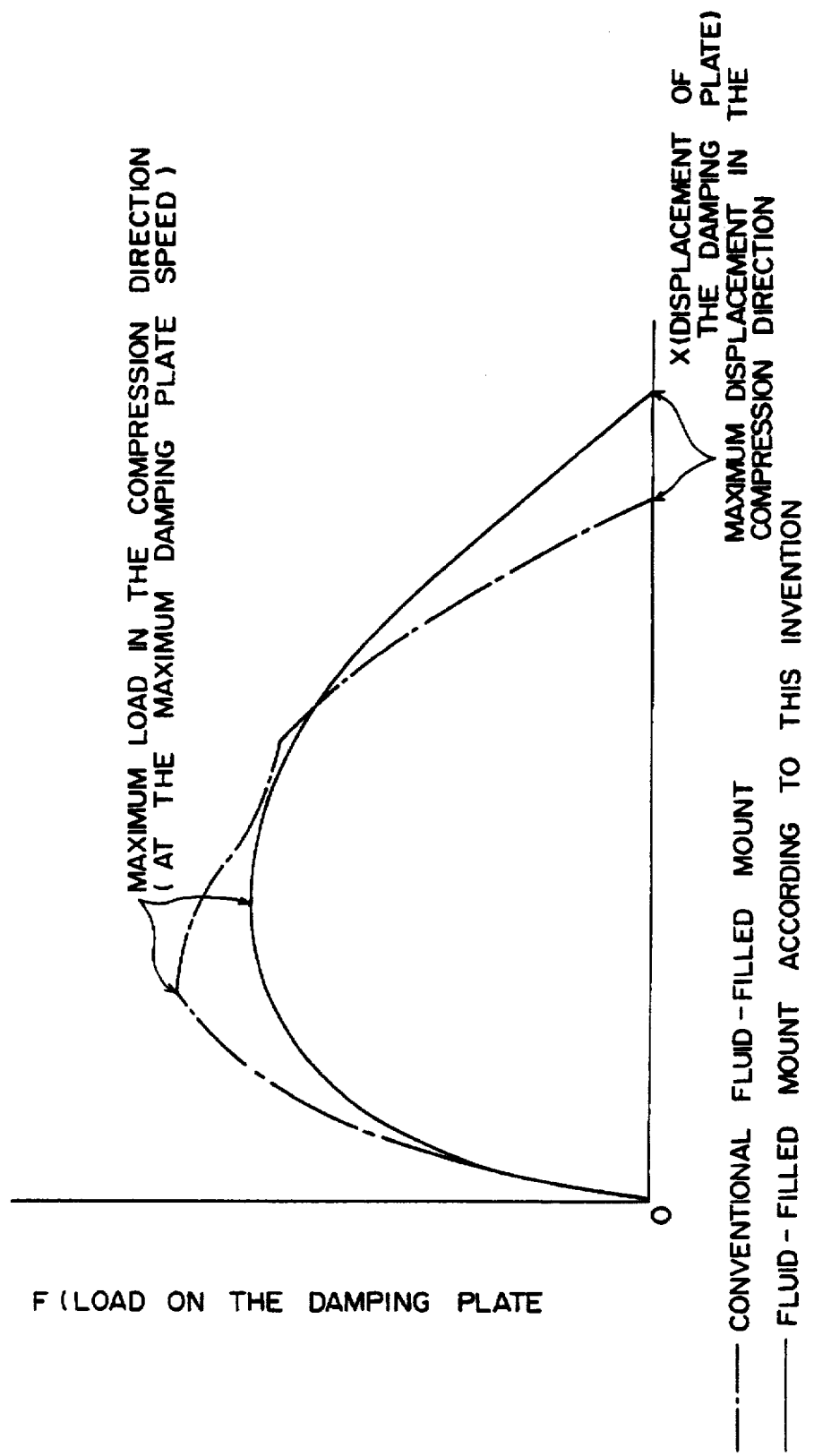
FIG. 14 is a diagram showing the load and displacement of the damping plate for the fluid-filled mount of FIG. 7 and for the conventional fluid-filled mount.

Such action is described with reference to FIG. 14, in comparison with the conventional fluid-filled mount. FIG. 14 shows the relation between the load and the displacement of the damping plate of fluid-filled mount during impact compression (by a solid line for the fluid-filled mount of this invention and by a dot-and-dash line for the conventional fluid-filled mount).

When impact is exerted on the damping plate, this plate moves in the compression direction (that is, the direction in which the damping plate is thrusted into the viscous fluid). At the maximum speed of this damping plate, the load on it becomes maximum. In the damping plate 15 of the fluid-filled mount of this invention, the valve 20 for high impact is provided to reduce the fluid pressure. This means that the maximum load is smaller in the fluid-filled mount of this invention than in the conventional one. Then, under the fluid pressure, the damping plate speed is slowed down. The point where this speed becomes zero corresponds to the maximum displacement of the damping plate in the compression direction.

In order to reduce the rate of transmission of steady-state vibrations during resonance of the fluid-filled mount, it is preferred to get greater damping of displacement of the damping plate 15. In general, this can be achieved by restricting the fluid flow path (clearance between the elastic body 17 and the damping plate 15). However, for such high impact as may be encountered for example when a tire falls into a big depression, if the fluid flow path is restricted excessively, the fluid pressure under the damping plate 15 becomes too high and the instantaneous load becomes greater.

Notwithstanding, according to this invention, since the damping plate 15 is provided with the valve 20 for high impact to reduce the fluid pressure in the compression direction (direction in which the damping plate 15 is thrusted into the viscous fluid 4) as described above, damping can be moderated so as to reduce the instantaneous load (which is the maximum load shown in FIG. 14). On the other hand, during tension (that is, in the direction in which the damping plate 15 is pulled up from the viscous fluid 4), practically the same magnitude of damping as that in the conventional fluid-filled mount can be maintained.

Figure 12:
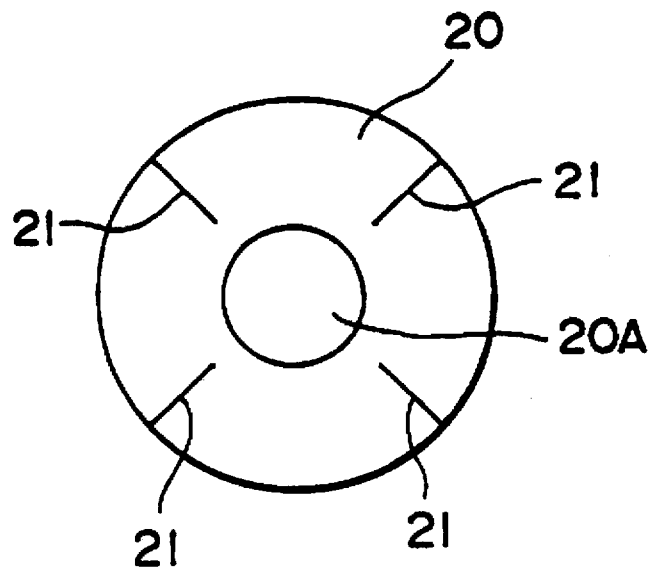
FIG. 12 is a plan view showing in detail another embodiment of the valve for high impact of FIG. 9.
Figure 13:
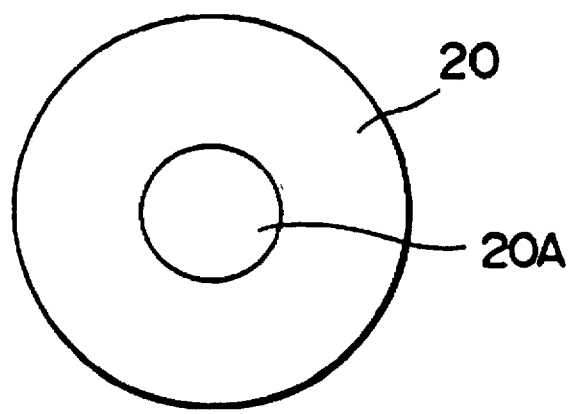
FIG. 13 is a plan view showing in detail the third embodiment of the valve for high impact of FIG. 9.

An example of the damping plate 15 wherein four openings 15B are provided is given in the above description. Naturally, the embodiment of this invention of FIG. 7 is not limited only to such an example, and either one to three, or five or more openings 15B may be provided in the damping plate 15 according to the desired damping characteristics. From this, it follows that the arms 20B of the valve 20 for high impact are provided correspondingly to the number of such openings 15B. As for the shape of the valve for high impact 20, it may naturally be either a disk with slits 21 as shown in FIG. 12 or a mere disk as shown in FIG. 13.

Further, the construction of the fluid-filled mount 10 referred to in the above description features a case 13 comprising mounting holes 13B and fixing claws 13C, damping plate 15 and cup 13A containing viscous fluid 4, and directly receiving vibrations from the outside; a cylindrical case 16 comprising mounting plate 16C having mounting holes 16B, and cylinder 16A; a stud 14 having an axial through hole 14A for filling of viscous fluid 4, a tapped hole 14B being provided in the said through hole 14B at one end of the said stud 14, and the said damping plate 15 being fixed to the other end of the said stud 14; and an elastic body 17 having the said cylindrical case 16 embedded in it and the said stud 14 secured in its center; the said elastic body 17 fitted solidly with the said stud 14 having the said damping plate 15 fixed to its end, and also with the said cylindrical case 16, being locked in the said cup 13A of the said case 13; and the said fixing claws of the said case 13 being bent onto the mounting plate 16C of the said cylindrical case 16. However, this invention is not limited only to such construction and can naturally be applied to various constructions of fluid-filled mount.

As described above, according to the fluid-filled mount 10 of FIG. 7, when such mount receives a high impact from the outside, the abrupt pressure rise of the viscous fluid 4 during the first shot of impact vibration can be prevented, so that the cab 5 can effectively be protected from vibration.

Figure 15:
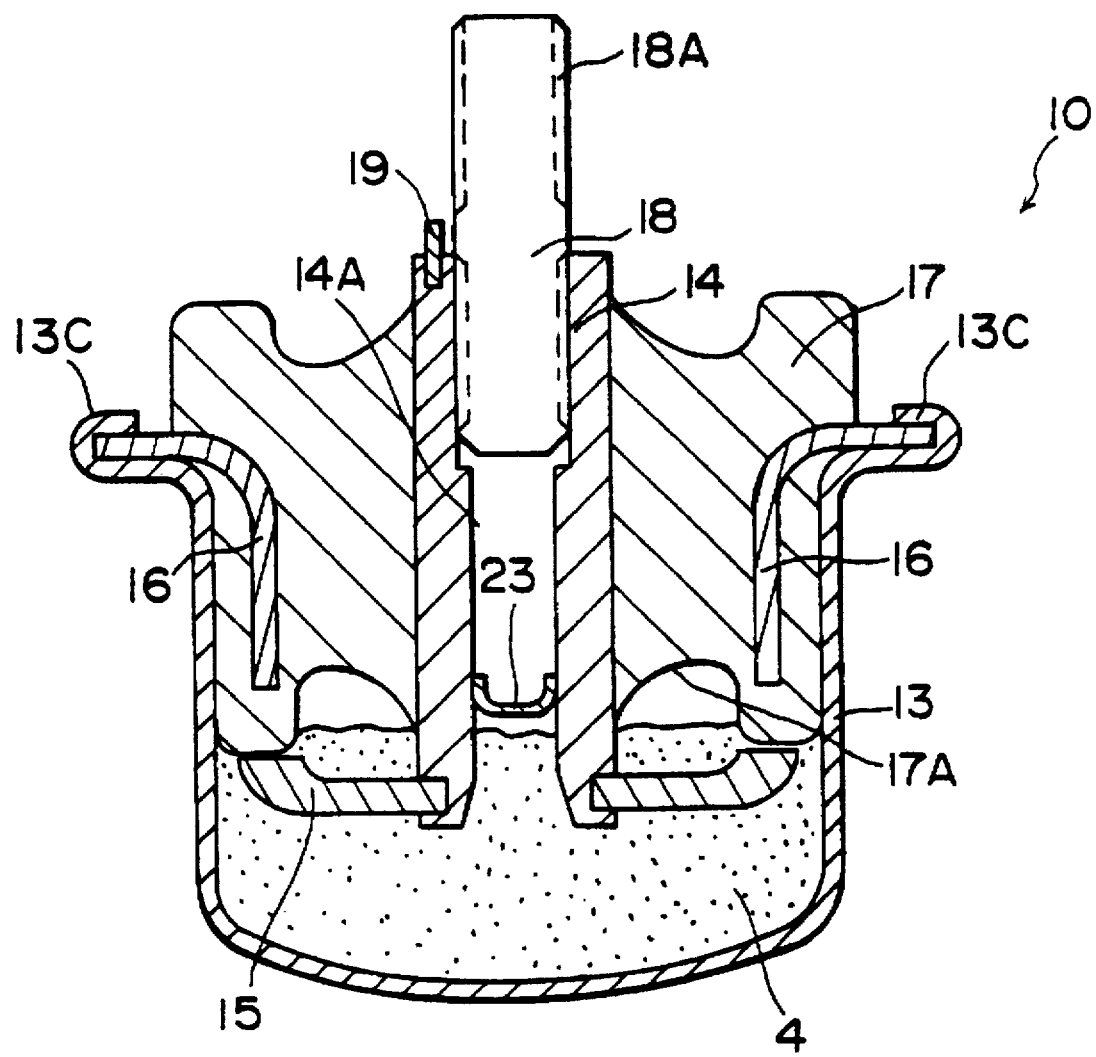
FIG. 15 is a sectional view showing the third embodiment of the fluid-filled mount of this invention.
Figure 16:
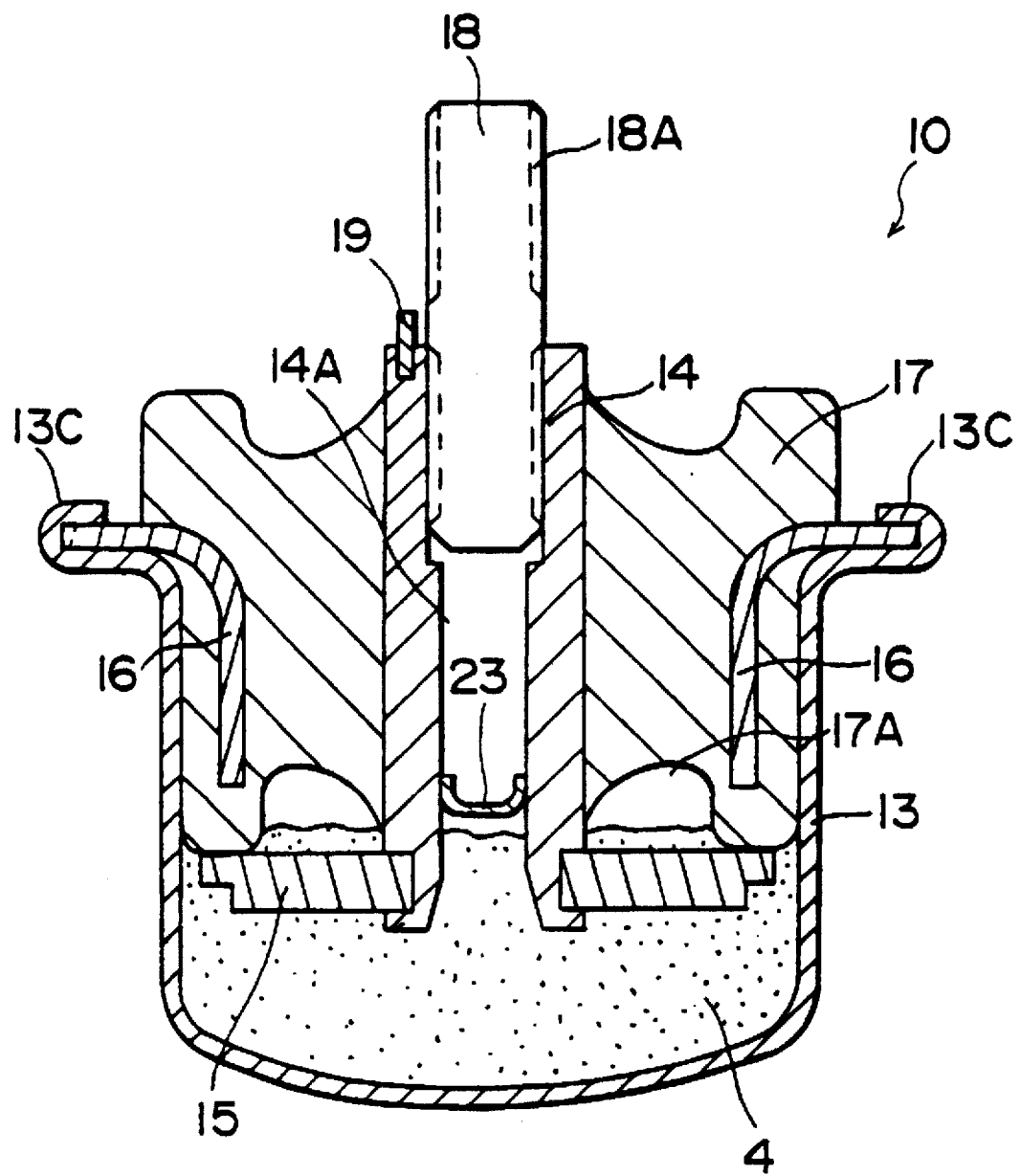
FIG. 16 is a sectional view showing the fourth embodiment of the fluid-filled mount of this invention.
Figure 17:
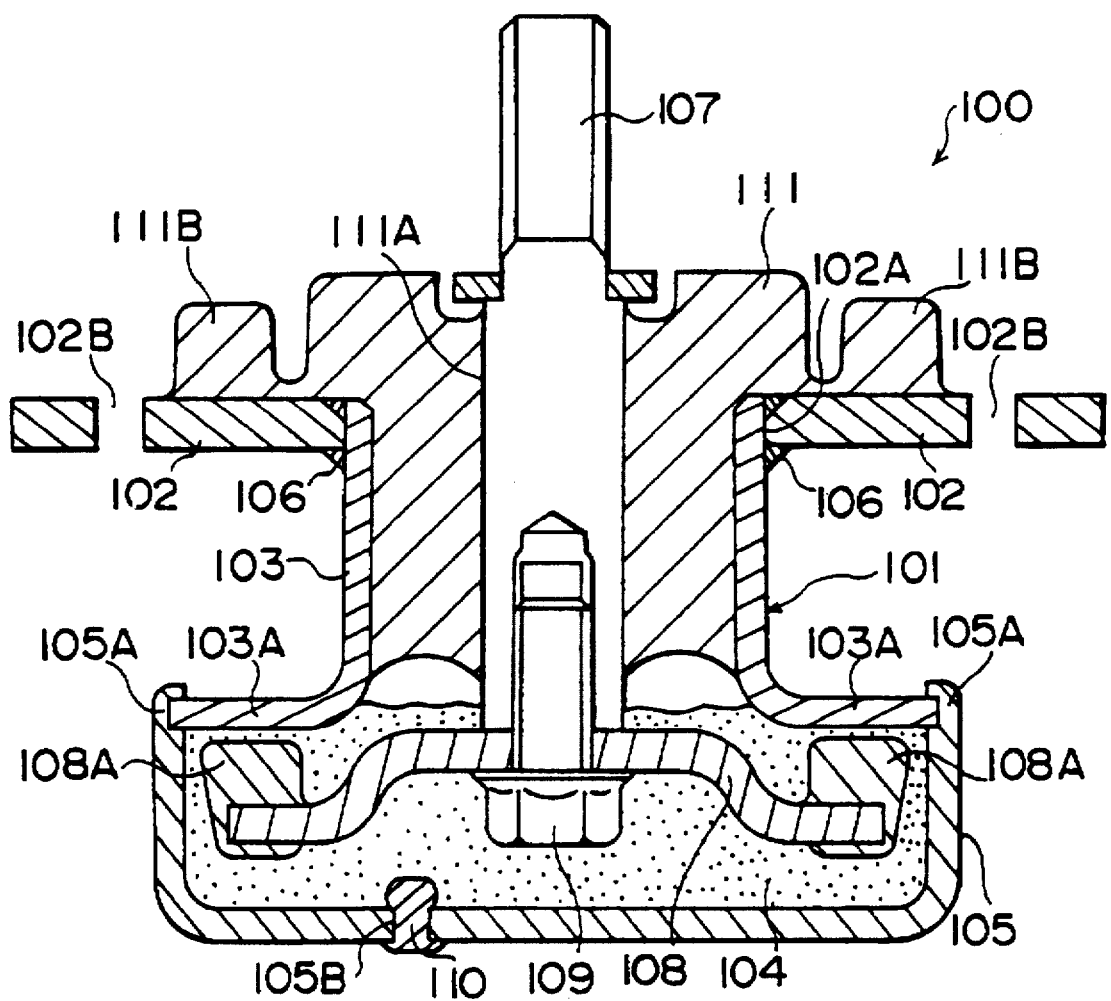
FIG. 17 is a sectional view showing in detail the conventional fluid-filled mount.

In the following, such other embodiments of the fluid-filled mount 10 of this invention as shown in FIG. 15 and FIG. 16 are described. The damping plate 15 has its top surface area made larger than its bottom surface area. A taper formed on its edge realizes this in the embodiment of FIG. 15.

In these figures, 23 is a cup-like plug which is fitted in the through hole 14A of the stud 14 to enhance the sealability.

As for the shock absorbing operation of the fluid-filled mount 10 of such setup, its damping ability can effectively be maintained even during continuous application of wide-amplitude vibrations. To be more exact, when the damping plate 15 moves downwards, the viscous fluid 4 smoothly flows toward the top surface side of the damping plate 15 thanks to the taper formed on its edge and, when the damping plate 15 moves upwards, it holds the viscous fluid 4 on its top surface. In this way, the pressure in the upper and lower fluid chambers is equalized. Thus, the damping plate 15 can always be in the viscous fluid 4 to effectively maintain its damping ability.

FIG. 16 is a sectional view showing the fourth embodiment of the fluid-filled mount 10 according to this invention. In this embodiment, the top surface area of the damping plate 15 is made larger than its bottom surface area by stepping its edge.

It is natural that the same damping operation described for FIG. 15 is obtained in the fluid-filled mount 10 of FIG. 16. The stepped damping plate 15 may naturally be made by sticking two plates of different diameters together.

According to such a setup, the damping ability for wide-amplitude vibrations can effectively be maintained by only changing the shape of the edge of the damping plate 15.

What is claimed is:

1. A fluid-filled mount having a case (13) having a mounting plate (13D) with mounting holes (13B) and fixing claws (13C), and also having a cup (13A) containing a high viscous fluid (4), and the case (13) receiving vibrations from outside;

a cylindrical case (16) having a mounting plate (16) with mounting holes (16B) and also having a cylinder (16A);

a stud (14) having an axial through hole (14A) for filling of said high viscous fluid (4), and also having a tapped hole (4B) provided in one end of said axial through hole (14A) and a damping plate (15) fixed to another end of stud (14);

an elastic body (17) having the said cylindrical case (16) embedded in the elastic body (17) and the stud (14) secured in a center hole in said elastic body (17), and said elastic body (17) having a tapered outside surface; and said high viscous fluid (4) filled in said cup (13A) of the case (13); further characterized in that said elastic body (17) integrated with said stud (14) having said damping plate (15) fixed to an end of stud (14) and said cylindrical case (16) is locked in the cup (13) of the case (13), and fixing claws (13C) of said mounting plate (13D) of said case (13) are bent onto the mounting plate (16C) of said cylindrical case (16) to fix these cases together, and said high viscous fluid (4) is filled into said cup (13A) of said case (13) through said axial through hole (14A) of said stud (14) so that said damping plate (15) is provided in said high viscous fluid (4), and said mounting holes (13B) in said mounting plate (13D) of said case (13) are in register with said mounting holes (16B) in said mounting plate (16C) of said cylindrical case (16) so that mount can be fitted to the bracket (3) by inserting bolts (128) through said mounting holes (13B) and (16B);

characterized in that a top surface area of said damping plate (15) is larger than a bottom surface area of damping plate (15) whereby the pressure of said high viscous fluid (4) is equalized when vibrating.

2. A fluid-filled mount having a case (13) having a mounting plate (13D) with mounting holes (13B) and fixing claws (13C), and also having a cup (13A) containing a high viscous fluid (4), and the case (13) receives vibrations from outside, a cylindrical case (16) having a mounting plate (16C) with mounting holes (16B) and also having a cylinder (16A); a stud (14) having an axial through hole (14A) for filling of said high viscous fluid (4) and also having a tapped hole (14B) provided in one end of axial through hole (14A) in said stud (14) and a damping plate (15) fixed to another end of said stud (14); an elastic body (17) having said cylindrical case (16) embedded in said elastic body (17) and the stud (14) secured in a center hole in said elastic body (17), said elastic body (17) also having a tapered outside surface; and said high viscous fluid (4) filled in said cup (13A) of the case (13);

further characterized in that said elastic body (17) is integrated with said stud (14) having said damping plate (15) fixed to an end of said stud (14); said elastic body (17) also integrated with said cylindrical case (16) such that said elastic body (17) is locked in the cup (13A) of the case (13), and that the fixing claws (13C) of said mounting plate (13D) of said case (13) are bent onto the mounting plate (16C) of said cylindrical case (16) to fix these cases together, and that said high viscous fluid (4) is filled into said cup (13A) of said case (13) through said axial through hole (14A) of said stud (14) so that said damping plate (15) is provided in said high viscous fluid (4), and that said mounting holes (13B) in said mounting plate (13D) of said case (13) are in register with said mounting holes (16B) in said mounting plate (16C) of said cylindrical case (16) so that mount can be fitted to the bracket (3) by inserting bolts (128) through said mounting holes (13B) and (16B):

characterized in that said damping plate (15) has a plurality of openings (15B); and also has valves (20B) which are made of spring material which usually shut said opening (15B) and open said opening (15B) when high impact is received, thereby preventing abrupt rising of the pressure of said high viscous fluid (4).

* * * * *